US005546751A

United States Patent [19]
Last

[11] Patent Number: 5,546,751
[45] Date of Patent: Aug. 20, 1996

[54] ANTI-CAVITATION MANIFOLD FOR DRIVE COUPLED, DUAL MOTOR, REVERSIBLE HYDRAULIC DRIVE SYSTEMS

[76] Inventor: Harry J. Last, 122 Dunecrest Ave., Monterey, Calif. 93940

[21] Appl. No.: 322,464

[22] Filed: Oct. 14, 1994

[51] Int. Cl.$^6$ ........................................... F16D 31/02
[52] U.S. Cl. ........................................ 60/424; 60/484/494
[58] Field of Search ........................... 60/420, 424, 473, 60/475, 484, 494; 4/502

[56] References Cited

U.S. PATENT DOCUMENTS

| | | | |
|---|---|---|---|
| 4,085,817 | 4/1978 | Kervagoret | 60/494 X |
| 4,098,083 | 7/1978 | Carman | 60/484 X |
| 4,203,289 | 5/1980 | Muschelknautz | 60/494 X |
| 4,215,622 | 8/1980 | Chichester | 60/484 X |
| 4,261,431 | 4/1981 | Hawbaker | 60/484 X |
| 4,310,062 | 1/1982 | Link et al. | 60/484 X |
| 4,346,763 | 8/1982 | Swanson et al. | 60/484 X |
| 4,813,234 | 3/1989 | Nikolaus | 60/484 |
| 5,184,357 | 2/1993 | Last | 4/502 |
| 5,327,590 | 7/1994 | Last | 4/502 |

*Primary Examiner*—John E. Ryznic
*Attorney, Agent, or Firm*—David E. Newhouse, Esq.

[57] ABSTRACT

An anti-cavitation hydraulic manifold for hydraulically coupling the hydraulic input and output of two, drive coupled, reversible hydraulic motors to a reversible source of hydraulic power is described which includes: (i) two high pressure hydraulic input/output (I/O) chambers receiving hydraulic input from a reversible hydraulic power source, each hydraulically coupled to a separate input/output (I/O) line of one reversible hydraulic motor; (ii) a common translation passage hydraulically communicating with each high pressure input/output (I/O) chamber and hydraulically establishing a common input/output (I/O) or bypass line for the respective reversible hydraulic motors; (iii) a shuttle ball within each high pressure input/output (I/O) chamber seatable upon a valve seat terminating the end of the translation passage for isolating the common translation passage and bypass line and directing high pressure hydraulic input from the reversible hydraulic power source to the separate input/output (I/O) line for 'driving' the particular reversible hydraulic motor; (iv) a shuttle rod translating in the translation passage having a length greater than that of the translation passage for functionally preventing the respective shuttle balls in the high pressure input/output (I/O) chambers from simultaneously seating upon respective valve seats terminating each end of the translation passage thus hydraulically coupling the hydraulic output of the 'driven' reversible motor to its input, i.e., to the common bypass line coupling the respective reversible motors.

21 Claims, 6 Drawing Sheets

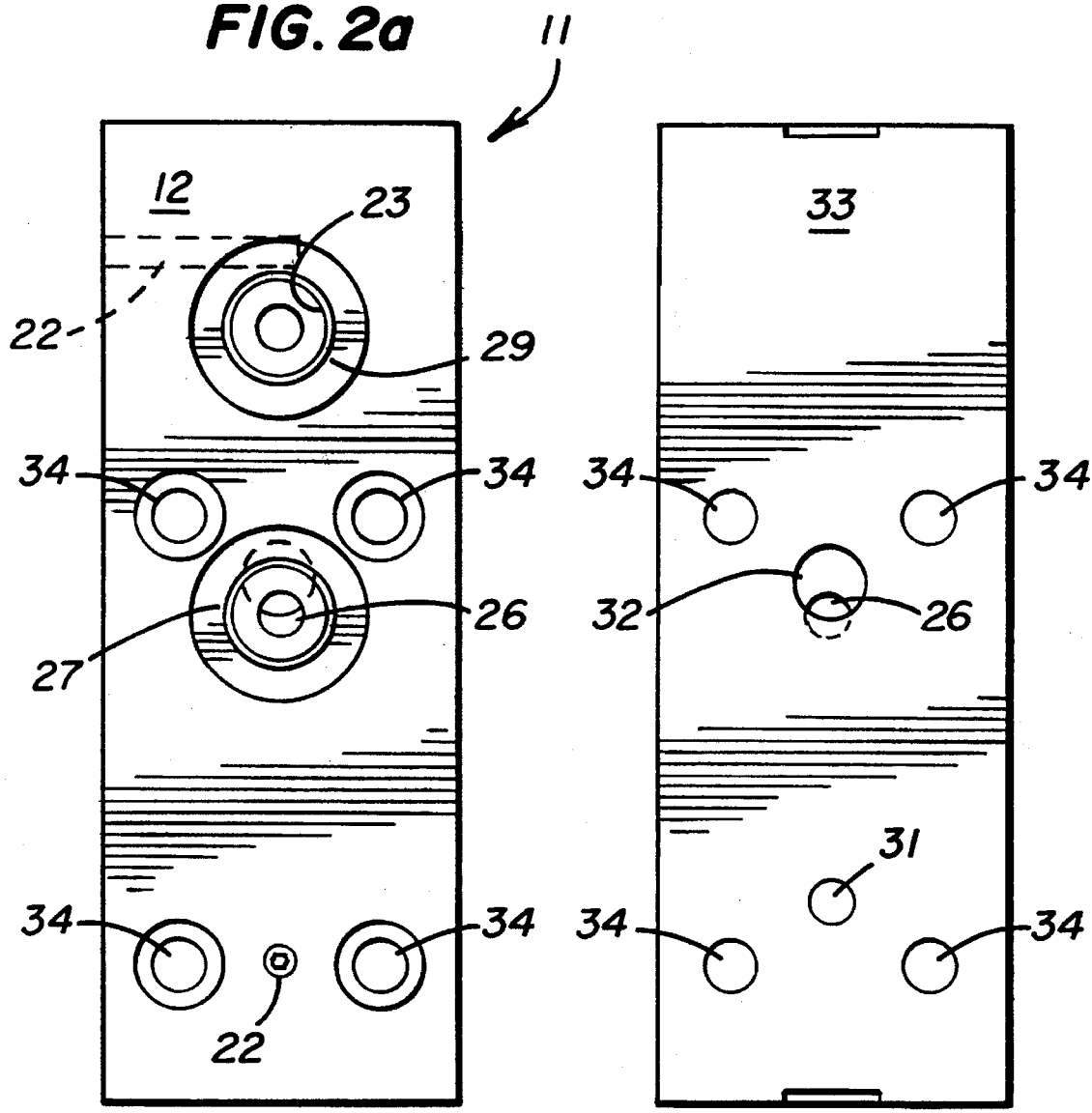
FIG. 2a
FIG. 2b
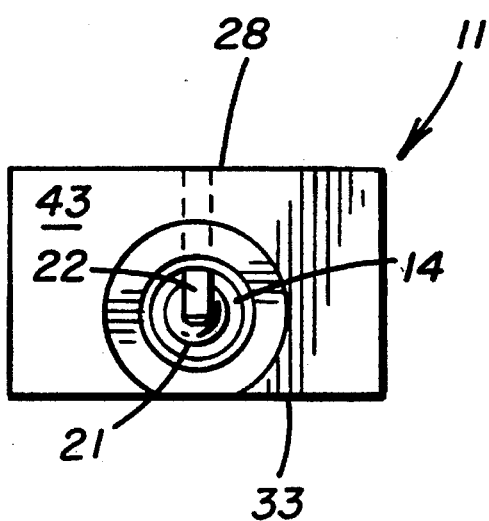
FIG. 2c

5,546,751

ANTI-CAVITATION MANIFOLD FOR DRIVE COUPLED, DUAL MOTOR, REVERSIBLE HYDRAULIC DRIVE SYSTEMS

BACKGROUND OF THE INVENTION

1. Field of Invention

The invention relates to drive coupled, dual motor, reversible hydraulic drive systems, and in particular, to an anti-cavitation hydraulic manifold hydraulically coupling the hydraulic inputs and outputs of the respective motors to a reversible source of hydraulic power.

2. Description of Prior Art

In U.S. Pat. Nos. 5,184,357 & 5,327,590 both entitled AUTOMATIC SWIMMING POOL COVER WITH A DUAL HYDRAULIC DRIVE SYSTEM respectively issuing Feb. 9, 1993 and Jul. 12, 1994, the Applicant describes a dual hydraulic drive system for automatic swimming pool cover systems in which a first hydraulic drive provides torque for both resisting cover drum rotation during pool cover extension across a swimming pool and rotating the cover drum for cover retraction, while a separate second hydraulic drive provides torque for both rotating the cable reels for cover extension and resisting cable reel rotation during cover retraction from across the swimming pool. The drives of the reversible hydraulic motors are mechanically coupled by interconnecting cables and the cover such that each functions as both a motor and a pump in such hydraulic drive systems, i.e., when one motor is hydraulically driven to provide torque, the other motor hydraulically responds as a pump. A manifold hydraulically couples the source of hydraulic power to the respective inputs of the driving motors and hydraulically couples the exhaust from the driving motor to input for the pumping motor. And, as explained by the applicant in U.S. Pat. No. 5,327,590 [Col. 8, 11. 25–40], when the hydraulic liquid exhausting from the driving motor exceeds the demand for liquid of the pumping motor, the pumping motor can be driven or rotated at a faster rate causing it to unwind a cable reel or cover drum at a rate faster than the driving motor winds the cover or cable with a consequent loss of resistance tension in the mechanical components of the system coupling the drives of the motors. On the other hand, when liquid supply from the driving motor is not sufficient, the pumping motor cavitates which causes sudden and erratic decreases in torque resistance at the drive shaft of the pumping motor with a consequent erratic decreases in tension/load on the mechanical components coupling the drives of the motors.

In the referenced patents, the Applicant teaches that loss of tension due to oversupply can be alleviated by locating check valves which functionally open to allow hydraulic liquid to flow from a common line hydraulically coupling output of the driving motor to the input of the pumping motor when pressure in the common line exceeds that in the output line of the pumping motor. U.S. Pat. No. 5,327,590 [Col. 8, 11. 41–45] Addressing the problem of erratic losses of resistance tension due to cavitation of the pumping motor proved more troublesome.

Initially, the applicant found that cavitation could be prevented by using a novel arrangement of conventional check valves and pressure relief valves [See U.S. Pat. No. 5,184,357, Claims 3 & 4,] which allowed the pumping motor to 'pump' or draw make-up liquid from the reservoir. That arrangement worked well provided the hydraulic liquid reservoir was hydraulically proximate to the coupled motors, however, it was discovered that when the source of hydraulic power and reservoir were located hydraulically remote from the coupled motors, the negative pressure or suction of the pumping motor was not sufficient to draw make-up liquid from the reservoir and intermittent cavitation resulted. The problem was particularly sever for long cover systems where the differential in wind-up diameters and consequent surface speeds of cable reel and cover drum were significant.

Subsequently, the applicant developed a novel manifold located hydraulically proximate to the coupled motors to preclude cavitation which included pilot operated check/lock valves which opened to hydraulically coupling the input or common bypass line to the exhaust input/output line of the pumping motor. [See U.S. Pat. No. 5,327,590, Claims 5–7] This allowed the pumping motor to draw made-up liquid from its own output, i.e., allowed the hydraulic liquid to loop back to the inlet side of the pumping motor. In this subsequent patent, applicant also pointed out that for optimal operation, it would be necessary, under some circumstances, to increase the volume of the common bypass line hydraulically coupling the motors such that it functioned as an reservoir cavity in order to preclude cavitation particularly at start up. [See U.S. Pat. No. 5,327,590, Col. 10, 11. 29–46.]

However, pilot operated check/lock valves proved to unsatisfactory when quickly reversing the drive, i.e., the status of the driving and pumping motors were switched. In particular, the change in hydraulic pressure was not promptly reflected in the respective pilot lines which momentarily caused one valve to open while allowing the other to remain open enabling the hydraulic liquid to circulate temporarily bypassing the coupled motors, i.e., to free-wheel. The inability to rapidly reverse the drive mechanism is a disadvantage and possibly hazardous because, for example, with automatic pool cover systems, it is desirable to be able to rapidly reverse cover extension to free a child or person trapped, for example, between the leading edge of the cover and an obstruction, or worse yet, beneath the cover.

Another characteristic of the drive coupled, dual motor, reversible hydraulic drive systems taught by the Applicant in his patents is that the respective drives of the respective motors inherently lock and do not rotate when the hydraulic liquid is precluded from circulating. Such locking has particular advantages as the Applicant points out in U.S. Pat. No. 5,327,590 [Col. 8, 1. 66–Col. 9, 1. 59]. However, such locking also has disadvantages in that, unless decoupling mechanisms such as ratchets are utilized to decouple rotation of the motor drive from that of a cable reel or cover drum, it is necessary disconnect one or more of the hydraulic lines to allow the locked motor to free-wheel in order, for example, to unwind a cable or cover from a reel or drum. In particular, often it is not desirable or even feasible to power-up the drive system in order to unwind or wind an interconnecting cable/cover mechanically coupling the motor drives. Also disconnecting the hydraulic lines means a probable contaminating spill and loss of hydraulic liquid.

SUMMARY OF THE INVENTION

An anti-cavitation hydraulic manifold for hydraulically coupling the hydraulic input and output of two, drive coupled, reversible hydraulic motors to a reversible source of hydraulic power is described which includes: (i) two high pressure hydraulic input/output (I/O) chambers receiving hydraulic input from a reversible hydraulic power source, each hydraulically coupled to a separate input/output (I/O) line of one reversible hydraulic motor; (ii) a common translation passage hydraulically communicating with each high pressure input/output (I/O) chamber and hydraulically establishing a common input/output (I/O) or bypass line for the respective reversible hydraulic motors; (iii) a shuttle ball within each high pressure input/output (I/O) chamber seatable upon a valve seat terminating the end of the translation passage for isolating the common translation passage and bypass line and directing high pressure hydraulic input from the reversible hydraulic power source to the separate input/output (I/O) line for 'driving' the particular reversible hydraulic motor; (iv) a shuttle rod translating in the translation passage having a length greater than that of the translation passage for functionally preventing the respective shuttle balls in the high pressure input/output (I/O) chambers from simultaneously seating upon respective valve seats terminating each end of the translation passage thus hydraulically coupling the hydraulic output of the 'driven' reversible motor to its input, i.e., to the common bypass line coupling the respective reversible motors.

A particularly novel and advantageous aspect of the invented anti-cavitation manifold relates to its simple tubular construction wherein a smaller diameter translation passage coaxially connects between two larger diameter input/output (I/O) chambers which in turn are coaxially coupled to the respective hydraulic lines of a reversible hydraulic power source. Each input/output (I/O) chamber has a perpendicularly penetrating port coupled to the separate input/output (I/O) line of one of the reversible hydraulic motors. The remaining input/output (I/O) lines of the reversible motors couple to each end of a common passage which perpendicularly intercepts the common translation passage which together establishing the common bypass line. The shuttle rod translates in the smaller diameter translation passage responsive to pressure differential between the respective input/output (I/O) chambers to provide the desired anti-cavitation hydraulic properties.

In particular, the invented manifold is easily and inexpensively fabricated by drilling a single passageway through a single block of material. The ends of the passageway are then enlarged and threaded forming two high pressure input/output (I/O) chambers adapted for coupling to two conventional hydraulic lines connectable to a reversible source of hydraulic power. Conical valve seats are machined into each end of the passageway opening into each of the enlarged input/output (I/O) chambers. A shuttle rod with a polygonal cross-section is introduced into the passageway connecting between the chambers, and a shuttle ball having a diameter greater than the passageway is placed in each enlarged input/output chamber. A each input/output (I/O) chamber includes a stop for confining the shuttle ball within the chamber. A common bypass passage is drilled through the block of material intercepting the passageway between the enlarged input/output (I/O) chambers establishing the bypass line for the two reversible motors. Two separate ports each perpendicularly drilled into one of the enlarged input/output (I/O) chambers are threaded for coupling to the respective separate input/output lines of the reversible motors. The remaining input/output lines from the reversible motors hydraulically couple at each end of the bypass passage.

In a preferred embodiment, the invented anti-cavitation manifold bolts directly onto the mounting face of one of the reversible hydraulic motor. The port of one input/output (I/O) chamber registers with the separate input/output port of the particular motor and one end of the common bypass passage intercepting the translation passage registers with the remaining inlet/outlet port of that motor. Conventional hydraulic lines couple the remaining reversible motor to the remaining input/output chamber and to the bypass passage.

A particular advantage of the invented anti-cavitation manifold is that liquid output of the pumping or driven motor is always directly looped back to its inlet side via the common bypass and translation passages of the manifold preventing cavitation, and therefore enabling it to a provide a constant tension resistance in the mechanical components linking the drives of the respective motors.

Another feature of the invented anti-cavitation manifold is that by orienting the manifold with its translation passage and shuttle rod aligned with a force gradient such as gravity, when the reversible source of hydraulic power is not energized, the manifold inherently hydraulically isolates the hydraulic input and output of the reversible motor coupled to the upper input/output (I/O) chamber preventing it from rotating while hydraulically coupling the hydraulic input and output of the reversible motor coupled to the lower input/output (I/O) chamber allowing it to rotate.

This latter feature has particular advantages for automatic swimming pool covers having dual hydraulic motor drive systems as described by Applicant in his U.S. Pat. Nos. 5,184,357 & 5,327,590 for preventing a phenomenon referred to as 'creep.' Creep results from elastic contraction of the cables and/or beaded cover edges after the pool cover is either extended or retracted. The contracting cables and beaded pool cover edges cause the cover to slowly retract or extend. To explain, when the diameter of the cover drum or cable real is large relative to other (a situation which occurs when the cover is fully retracted or extended), the force required for turning the larger diameter drum/reel because of its longer lever arm, is less than that for turning the smaller diameter drum/reel. The result is, that if the larger drum/reel is free to rotate, the cover will extend/retract to relieve the tension in the cables and/or beaded pool cover edges. Such creep phenomenon also occurs in clutch decoupled, single hydraulic drive pool cover drive systems, particularly when the brake resistance applied at the cable reel is insufficient overcome torque due to contracting elastic beaded pool cover edges tending to unwind the fully wound (large diameter) cable reel.

With the invented anti-cavitation manifold, by hydraulically coupling the reversible motor rotating the cable reel to the upper input/output (I/O) chamber, the cable reel will be inherently locked after extension of the cover closing the pool, and, since the remaining reversible motor rotating the cover drum is hydraulically coupled to the lower input/output (I/O) chamber and is free to rotate, tension due to elasticity of the cables and/or beaded pool cover edges is relieved by the drum rotating, not the cable reels. This provides a highly desired safety feature in that the cover will not creep or retract from its fully closed position, thus preventing an attractive open water hazard to small children until the cover is once again retracted opening the pool.

Another important feature of the invented anti-cavitation manifold is that remains in its particular operating configuration until switched. In particular, the driving motor remains locked with its input hydraulically isolated from its output while the driven or pumping motor with its input hydraulically coupled to its output is free rotate when the reversible motors and manifold are isolated from the source of hydraulic power. This is true even when the manifold is biased by gravity or another force tending to translate the shuttle rod for switching the status of the driving motor to pumping motor status with its output coupled to its input, because the pressure difference between the respective input/output (I/O) chambers delays the shuttle rod from immediately translating displacing the shuttle ball from the valve seat. In pool cover systems where the driving motor is winding the pool cover around the cover drum completely retracting the cover from across the pool, such delay allows tension to release in the cables and beaded cover edges by unwinding cable from around the cable reels and not the cover from cover drum. Accordingly, once completely retracted the cover does not 'creep' out from the cover drum housing.

This latter feature also enables an operator or service person to rotate the element coupled to the drive of the pumping motor without disconnecting the motor from its hydraulic supply lines. Accordingly, the principal source of contaminating spills of hydraulic liquid can be substantially eliminated. For example, in drive coupled, dual motor, reversible hydraulic drive systems of the type described by Applicant in his U.S. Pat. Nos. 5,184,357 & 5,327,590, after the pool cover is completely retracted (wound around the cover drum) the hydraulic power can be reversed momentarily switching the reversible motor rotating the cover drum to pumping motor status. Such action frees the cover drum for rotation enabling one to unwind and remove the cover from around the drum in the drum trench for repair or replacement without having to disconnect the hydraulic liquid supply lines. Using a similar technique, the cables can be unwound from around the cable reels allowing for replacement and length adjustments.

Still other features, aspects, advantages and objects presented and accomplished by the invented anti-cavitation hydraulic manifold drive coupled drive, dual motor, reversible hydraulic drive system will become apparent and/or be more fully understood with reference to the following description and detailed drawings of preferred and exemplary embodiments.

DESCRIPTION OF THE DRAWINGS

FIGS. 2a, 2b & 2c present a top view, bottom view, and end view respectively of the invented anti-cavitation manifold showing ports for coupling to two reversible hydraulic motors and to a reversible source of hydraulic power.

DESCRIPTION OF PREFERRED AND EXEMPLARY EMBODIMENTS

Figure 1:
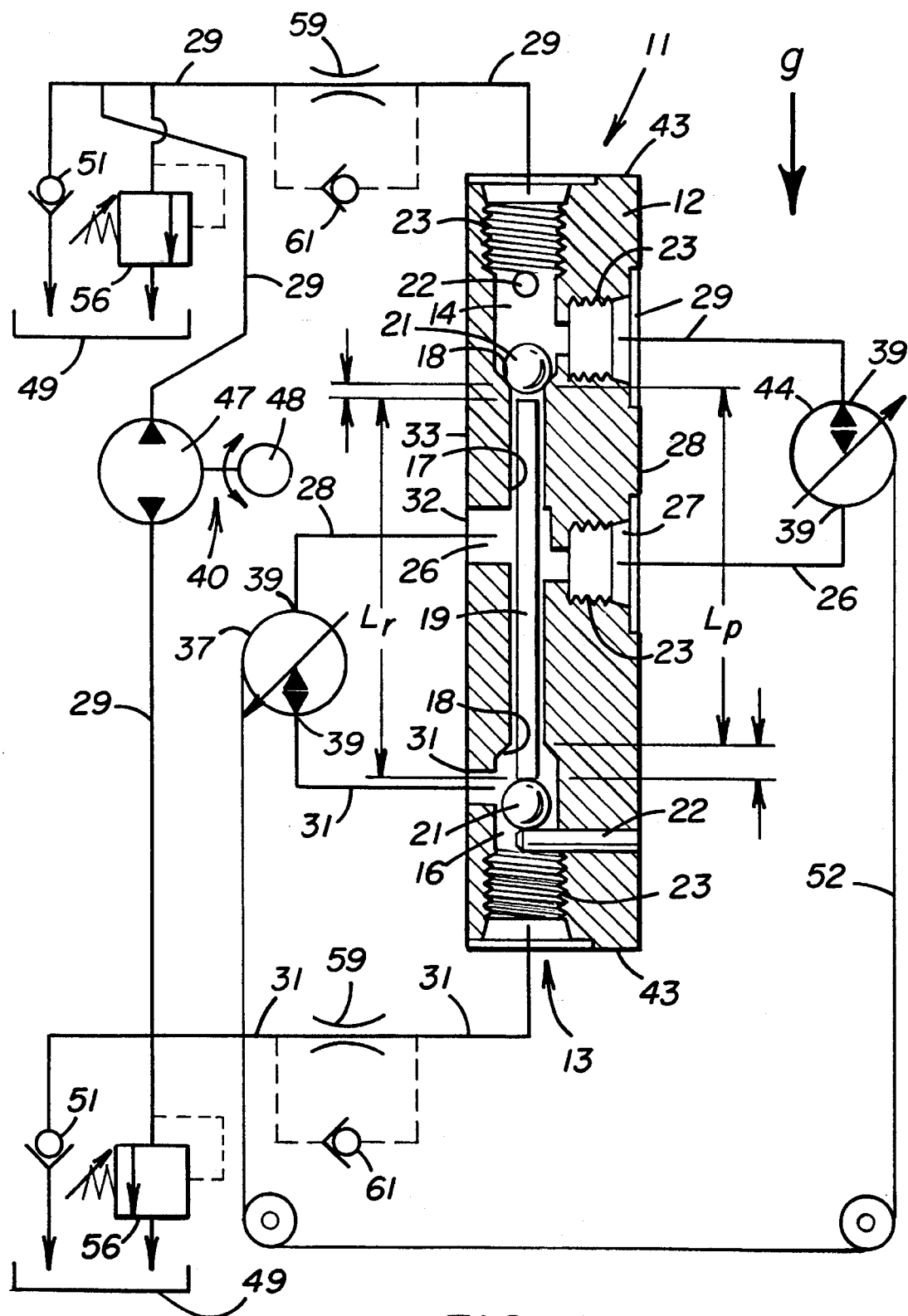
FIG. 1 is a cut away plan view of the invented anti-cavitation manifold with a diagram schematically showing the remaining components of the hydraulic circuit for a coupled drive, dual motor, reversible hydraulic drive system.

The invented anti-cavitation manifold for drive coupled, dual motor, reversible hydraulic drive systems is particularly useful in context of the hydraulic drives Applicant invented and developed for his automatic pool cover systems. Accordingly, reference should be made to Applicant's U.S. Pat. Nos. 5,184,357 & 5,327,590 both entitled AUTOMATIC SWIMMING POOL COVER WITH A DUAL HYDRAULIC DRIVE SYSTEM respectively issuing Feb. 9, 1993 and Jul. 12, 1994, to obtain a detailed description of those systems.

For detailed descriptions of other features, characteristics and properties of automatic swimming pool cover systems invented and developed by the Applicant, reference should also be made to: (i) Applicant's U.S. Pat. No. 4,939,798 entitled: "LEADING EDGE AND TRACK SLIDER SYSTEM FOR AN AUTOMATIC SWIMMING POOL COVER", issued Jul. 10, 1990; (ii) Applicant's U.S. Pat. No. 5,067,184 entitled "A COVER DRUM HAVING TAPERED ENDS FOR AN AUTOMATIC SWIMMING POOL COVER." issued Feb. 26, 1991; and (iii) Applicant's U.S. Pat. No. 5,349,707 entitled "A SPLIT STOP FOR AUTOMATIC SWIMMING POOL COVERS WITH A HYDRAULIC DRIVE SYSTEM" issued Sep. 27, 1994.

However, it should be appreciated that invented anti-cavitation manifold can be used with any drive coupled, dual motor, reversible hydraulic drive system for preventing cavitation where the rotational velocity of the pumping or driven motor is a function of the surface velocity of a winding means rotated by the driving motor. Such drive coupled, dual motor, reversible hydraulic drive systems have advantages for extending and retracting large blinds and rollable barriers for windows/doors, wall screens, swimming pool covers and the like. Such drive systems also have utility for winding and unwinding any rollable sheet or cord material or combination thereof between two drums and/or reels.

With reference to FIGS. 1, & 2a–c, the invented anti-cavitation manifold 11 is formed in a single hexahedral block of material 12 such as stainless steel by drilling a cylindrical tubular passageway indicated by arrow 13 completely through the block 12. The ends of passageway 13 opening onto the end faces 43 of the manifold block are enlarged to form two, essentially identical, high pressure input/output chambers 14 and 16. The section of passageway 13 connecting between the input/output chambers 14 & 16 becomes a translation passage 17 and has a length $L_p$. Conical valve seats 18 are machined at the respective ends of the translation passage 17. A shuttle rod 19 having a length $L_r$ where $L_r > L_p$ is placed in the translation passage 17. The shuttle rod 19 has a regular polygonal cross-section, preferably square or triangular to minimize friction between the cylindrical side wall of the translation passage 17 and the shuttle rod 19, and to allow hydraulic liquid to flow through the translation passage. Stainless steel shuttle balls 21 having diameters greater than that of the translation passage 17 are placed in the input/output chambers 14 & 16. The diameter of each shuttle ball 21 is determined with reference to the dimensions of the conical valve seats 18 such that when seated upon a valve seat 18, the shuttle ball hydraulically isolates the translation passage 17 from that particular inlet/outlet chamber 14/16. Since the length ($L_r$) of the shuttle rod is greater than that of the translation passage 17 ($L_p$), it should be appreciated that the shuttle balls 21 can not simultaneously seat on the respective valve seats 18. Stops 22, preferably small diameter removable threaded rods, penetrate through a side face 44 of the manifold block 12 into the respective input/output chambers 14 & 16 for confining the steel shuttle balls 21 within the respective input/output chambers 14 & 16. Threads 23 are cut into the interior cylindrical walls at the open ends of the input/output chambers 14 and 16 for coupling to conventional hydraulic lines 24. [See FIG. 5] A common or bypass line 26 is drilled completely through the manifold block 12 perpendicularly intersecting the translation passage 17 midway between its ends (the input/output chambers 14 and 16). Threads 23 are cut into end 27 of the bypass line 26 opening on the top face 28 [FIG. 3b] of the manifold block 12 for coupling to a conventional hydraulic line 24. Two separate ports 29 & 31 are drilled into manifold block 12 each perpendicularly penetrating from opposite faces of the manifold block into an input/output chamber 14 & 16 respectively. Threads 23 are cut into separate port 29 drilled into the top face 28 of manifold block 12 for coupling to a conventional hydraulic line 24. Separate port 31 and the remaining end 32 of bypass line 26 opening on the bottom face 33 of the manifold block are not threaded. Mounting holes 34 are drilled through the manifold block 12 allowing the invented anti-cavitation manifold to be bolted onto a mounting face 36 of a reversible hydraulic motor 37.

Figure 5:
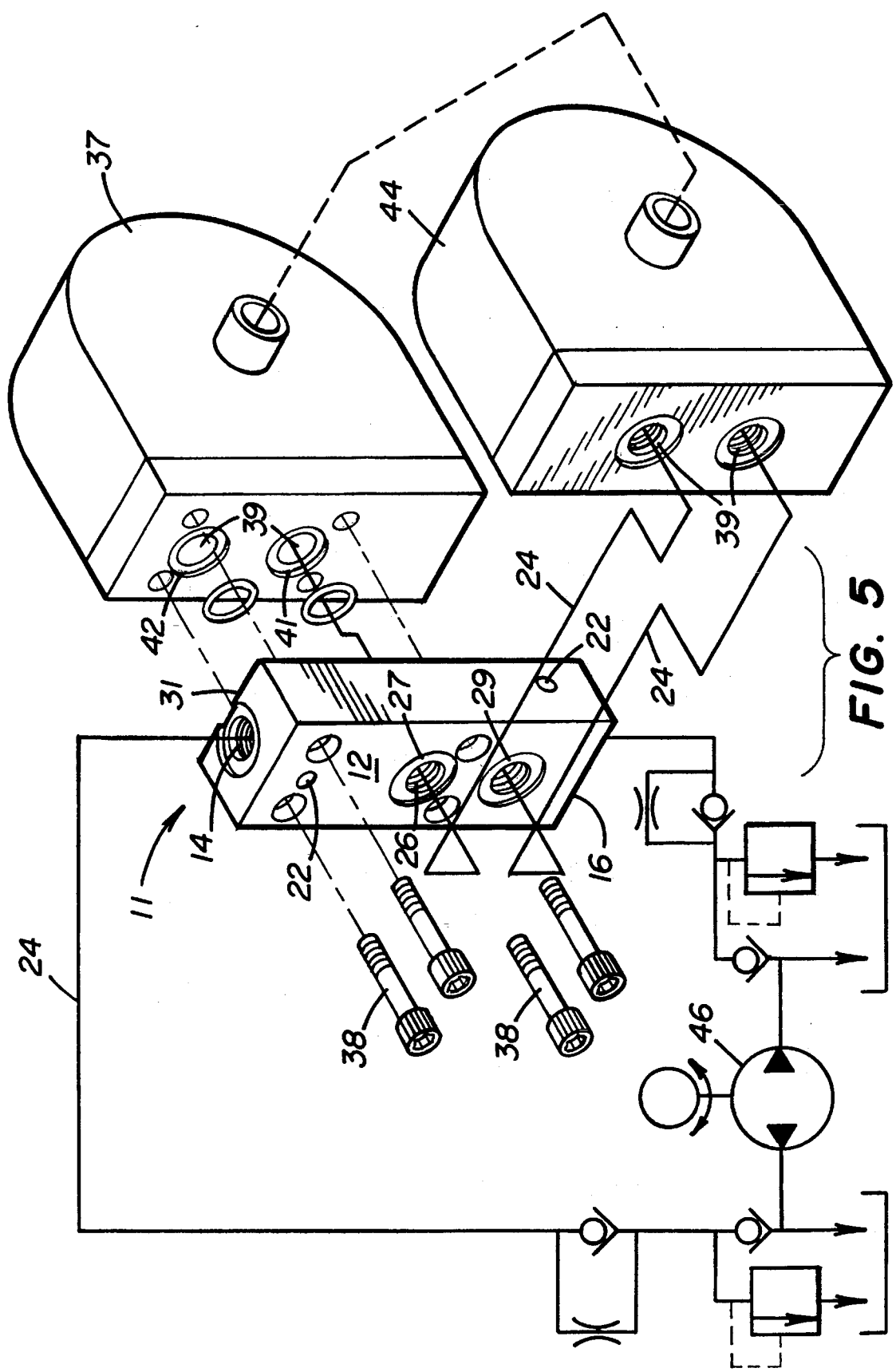
FIG. 5 is an exploded illustration showing how the invented anti-cavitation manifold is interconnected between the two motors of a drive coupled, dual motor, reversible hydraulic drive system. (Conventional hydraulic lines connecting the invented manifold to the reversible source of hydraulic power are schematically indicated.)

In particular, with reference to FIG. 5, the anti-cavitation manifold 11 is secured by bolts 38 to the mounting face 36 of a reversible motor 37. Separate port 31 and open end 32 of bypass line 26 opening on the bottom face 33 of the manifold block each register with an input/output port 39 of motor 37. Conventional 'O'-ring seals 41 seated in conventional 'O'-ring channels cut into the mounting face 36 of motor 37 seal coaxially around the input/output ports 39 against the flat bottom face 33 of the manifold block 12. Separate hydraulic lines 24 couple separate port 29 and threaded end 27 of bypass line 26 to the input/output ports 39 of a second reversible hydraulic motor 44. Conventional hydraulic lines 24 also couple a reversible source of hydraulic power 46 to the threaded openings of the input/output chambers 14 & 16.

Figure 3:
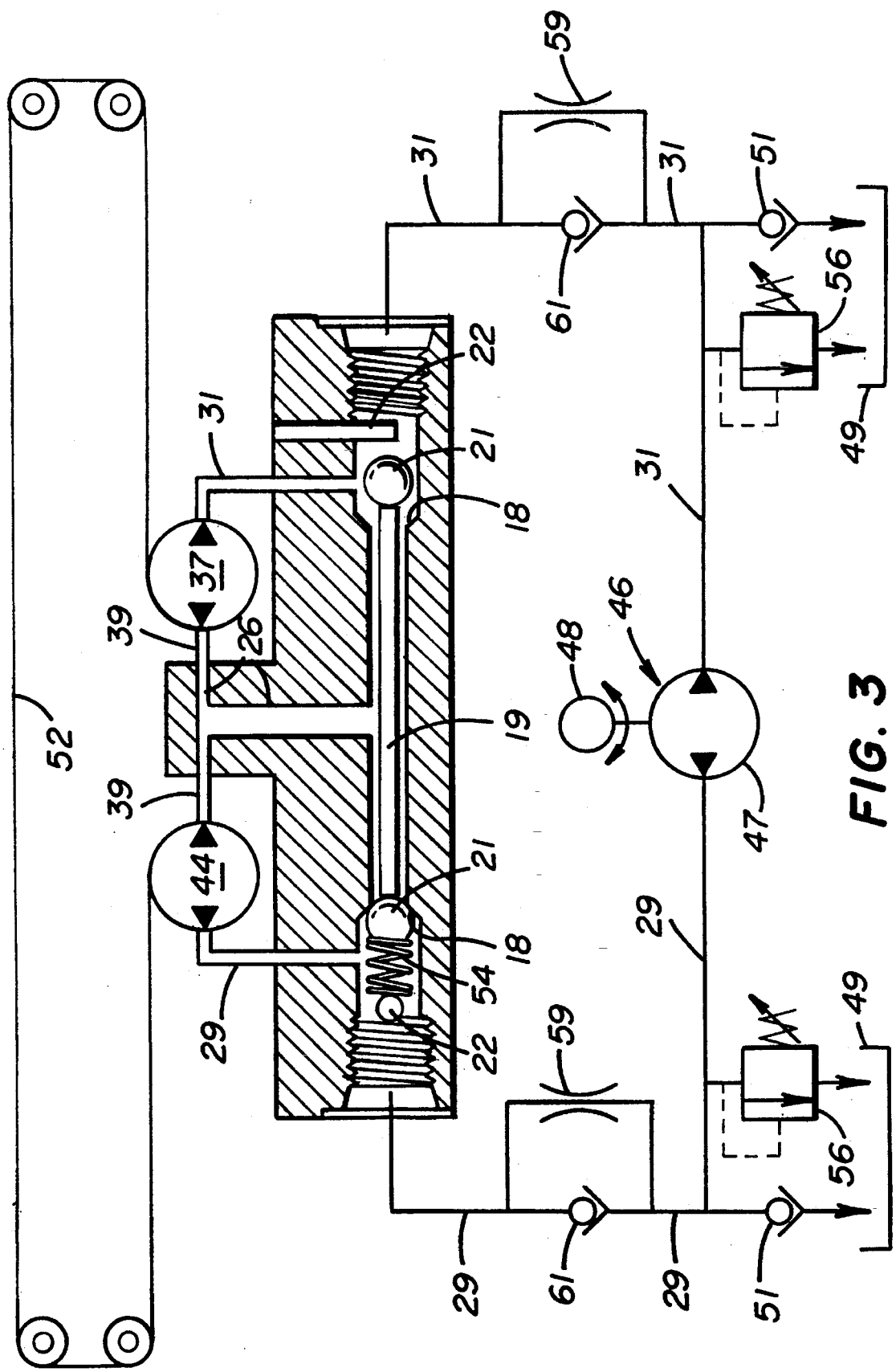
FIG. 3 is schematic drawing showing the invented anti-cavitation manifold incorporated into hydraulic circuit for a coupled drive, dual motor, reversible hydraulic drive system.

With reference to schematic diagram presented by FIGS. 1 & 3, the basic hydraulic circuit for which the invented anti-cavitation manifold includes: (i) dual reversible drive hydraulic motors 37 & 44; (ii) mechanical components 52 mechanically coupling the respective drives of the motors 37 & 44; (iii) a reversible source of hydraulic power 46 comprising a pump 47 and a reversible motor 48; (iv) a separate input/output line 29 for reversible drive motor 44; (v) a separate input/output line 31 for reversible drive motor 37; (vi) a common bypass line 26 hydraulically coupling the remaining input/output lines 39 of reversible motors 37 & 44; (vii) a pair of adjustable pressure relief valves 56 for the respective separate input/output lines 29 & 31; (viii) check valves 51; and (ix) a hydraulic liquid reservoir tank 49. For optimization, the hydraulic circuit may also include a flow restrictor 59, with a check valve bypass 61 incorporated into the respective input/output lines 29 & 31. However, as a practical matter the skilled hydraulic designer should recognize that the functional properties of such flow restrictor 59 and check valve bypass 61 are inherently provided by the shuttle balls 21 within the I/O chamber 14 & 16 being alternately positioned at their respective stops 22 (flow restriction), or seated upon their respective valve seats 18 (flow restriction bypass). Accordingly, it is possible to optimize the hydraulic circuit by adjusting the ratios of the respective diameters of the I/O chambers 14 & 16, the shuttle balls 21 and the stops 22. Other design alternatives include coupling hydraulic lines 24 [FIG. 5] from the reversible source of hydraulic power 46 to the respective I/O chambers 14 & 16 with couplings which have a specially designed interior flow restricting annular seating surfaces for receiving the shuttle ball 21 upon circulation of hydraulic liquid from a particular I/O chamber 14 or 16 to the reversible power source 46.

In the diagrams of FIGS. 1 & 3, the invented anti-cavitation manifold includes: (a) the common bypass line 26 connecting at its respective ends to an input/output line 39 of each reversible motors 37 & 44; (b) the translation passage 17; (c) valve seats 18 and shuttle balls 21 for separately isolating the translation passage 17 and bypass line 26 from high pressure hydraulic input from the reversible power source 46; and (d) shuttle rod 19 having length $L_r$ greater than the length of passage 17 $L_p$ for preventing the shuttle balls 21 from simultaneously seating upon valve seats 18. (In FIG. 3, the components within the anti-cavitation manifold 11 are indicated by the enclosing line 57.)

The invented anti-cavitation manifold 11 may also be biased either by appropriately orienting the manifold 11 with its translation passage in a force gradient such as gravity (indicated by arrow g in FIG. 1), or by including a biasing spring 54 in one input/output chamber 14 for forcing the shuttle ball 21 in that chamber against the valve seat 18 [FIG. 3].

Figure 4:
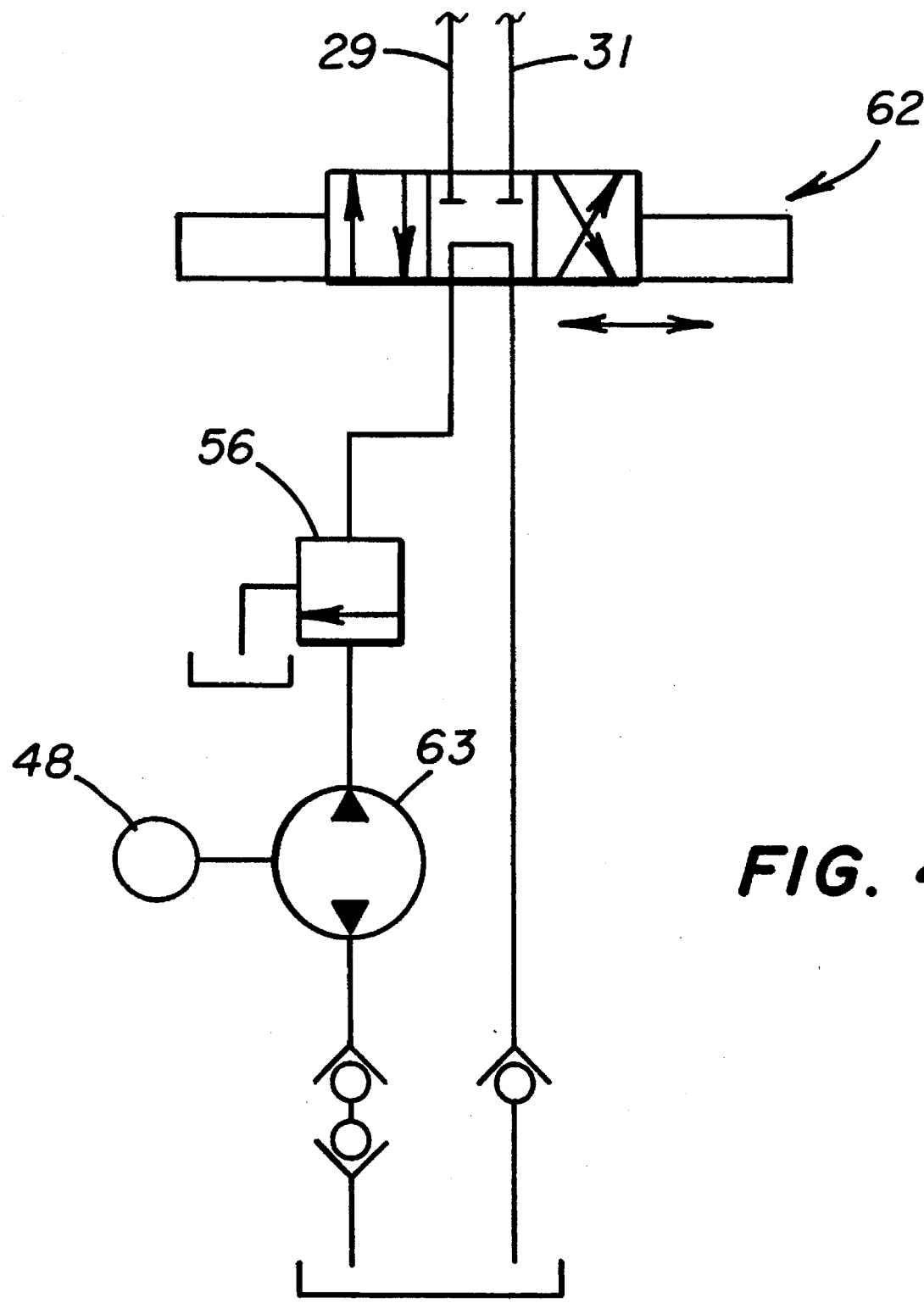
FIG. 4 is a schematic illustrating an alternative mechanism for providing a reversible source of hydraulic power.

FIG. 4 illustrates an alternative mechanism for providing a reversible source of hydraulic power which includes a three position solenoid valve 62 for directing flow from a source of pressurized hydraulic liquid 63 and can be substituted for the reversible pump 47 and motor 48 in the hydraulic circuits diagrammed in FIGS. 1 & 3. It should be appreciated that in its middle position, solenoid valve 62 prevents circulation in the hydraulic loop which includes the dual motors 37 & 44 and the invented anti-cavitation manifold 11. Pump 47 shown FIGS. 1 & 3 will similarly prevent circulation in the hydraulic loop when not driven by motor 48.

Looking at FIGS. 1 & 3, the invented anti-cavitation manifold functions as follows: a) With pump 47 pumping hydraulic liquid clockwise, high pressure liquid circulates from pump 47 via bypass check valve 61 in separate input line 29 to input/output chamber 14, driving ball 21 toward and against valve seat 18, translating shuttle rod 19 in the translation passage and isolating passage 17 from the high pressure liquid while simultaneously dislodging ball 21 in chamber 16 from its valve seat 18. The circulating liquid drives reversible motor 44 rotating its drive shaft in the driving direction and exhausts into common bypass line 26. The rotating drive shaft of motor 44 winds mechanical components 52 coupled for rotating the drive shaft of reversible motor 37 causing it to pump hydraulic liquid from common bypass line 26. b) Should the rate of hydraulic liquid exhausting into the bypass line 26 from 'driving' motor 44 exceed the demand rate for liquid of 'pumping' reversible motor 37, excess liquid circulates via translation passage 17 to input/output chamber 16 and out input/output line 31 through flow restricter 59 back to the reversible pump 47. c) Should demand rate for hydraulic liquid of the 'pumping' motor 37 exceed the liquid exhaust rate from 'driving' motor 44 into the bypass line 26, hydraulic liquid circulates from input/output chamber 16 receiving the hydraulic liquid output of 'pumping' motor 37 via separate port 31 into translation passage 17 to bypass line 26 which means that the output and input of the pumping motor are hydraulically coupled. d) Reversing pump 47, high pressure hydraulic liquid circulates counter-clockwise via bypass check valve 61 in separate input line 31 to input/output chamber 16 driving ball 21 toward and against valve seat 18 overcoming the biasing mechanism (gravity g in FIG. 1 or spring 54 in FIG. 3) translating shuttle rod 19 in the translation passage isolating passage 17 from high pressure liquid while simultaneously dislodging ball 21 in chamber 14 from its valve seat 18. The liquid now circulates for driving reversible motor 37 rotating its drive shaft in the driving direction and exhausts into the common bypass line 26. Driving rotation of shaft of motor 37 winds mechanical components 52 coupled for rotating the drive shaft of reversible motor 44. Accordingly, reversible motor 44 is now 'driven', and pumps liquid from the common bypass line 26. e) When pump 47 is not circulating hydraulic liquid, the biasing mechanism (gravity g in FIG. 1 or spring 54 in FIG. 3): (i) hydraulically prevents rotation of the drive shaft of reversible motor 44 in its 'pumping' direction while permitting rotation of its shaft in the 'driving' direction; and (ii) hydraulically permits drive shaft of reversible motor 37 to rotate both in the 'driving' and 'pumping' directions. (It should be appreciated that 'driving' rotation of a drive shaft of the respective reversible motors 37 & 44 is in an opposite direction to their 'pumping' rotation.)

In more detail, when the drive coupled, dual motor, reversible hydraulic drive is not operating, ball 21 in chamber 14 responsive to the biasing force, seats on valve seat 18 isolating chamber 14 and separate input/output port/line 29 from the common bypass line 26. Accordingly, rotation of the drive shaft of motor 44 in the pumping direction responsive to an external force, requires motor 44 to 'pump' liquid into a liquid full chamber 14 and separate input/output line 29. This can only happen if reversible pump 47 rotates responsive to input of liquid into output line 29, or if the pressure in input line 29 increases sufficiently to open pressure relief valve 56 allowing liquid to drain into reservoir 49. However, rotation of the drive shaft of motor 44 in the driving direction responsive to an external force, requires motor 44 to 'pump' liquid from chamber 14 and separate input/output line 29 Conceivably, such 'pumping' could reduce pressure sufficiently in input/output chamber 14 to overcome the biasing force of gravity g or spring 54 to allow hydraulic coupling to the bypass line 26 and the other input/output (I/O) port 39 of motor 44. Under such circumstances, drive shaft of motor 44 could be rotated in the 'driving' direction responsive to an outside force.

In contrast, the biasing force of gravity g or spring 54 prevents ball 21 in I/O chamber 16 from seating on valve seat 18. Accordingly the respective I/O ports 39 of motor 37 are hydraulically coupled via the translation passage 17 and bypass line 26. This means that the drive shaft of reversible motor 37 is free to rotate in either the 'driving' or 'pumping' direction responsive to an external force sufficient to overcome friction resistance to circulation of hydraulic liquid through motor 37 and the loop defined through the invented manifold coupling the respective I/O ports 39 of that motor.

Also with reference to FIG. 1, upon reversing circulation of the hydraulic liquid using pump 47 or solenoid valve 62, it should be appreciated that for a finite time, the high pressure liquid from pump 47 can circulate through translation passage 17 of manifold 11 bypassing both motors 37 & 44 until ball 21 on the high pressure side seats on valve seat 18 for directing the high pressure liquid to drive one of the dual motors 37 & 44. This is proportional to the difference in lengths ($\Delta L$) of the translation passage 17 ($L_p$) and the shuttle rod 19 ($L_r$), i.e., $t_s \alpha \Delta L = (L_r - L_p)$. Other factors which affect the switching time interval ($t_s$) are friction resisting translation of shuttle rod 19 in passage 17, and the effective hydraulic resistance ($h_r$) presented by passage 17 with inserted rod 19 to circulation of liquid through it. It should be appreciated that a skilled hydraulic designer can utilize the parameters discussed above to provide desired switching properties adapting coupled drive, dual motor reversible hydraulic drive systems for servo positioning of objects.

More importantly, while the combination of the shuttle balls 21, the valve seats 18, and the shuttle rod 19, of the invented manifold have functional characteristics similar to that of check valves for directing the high pressure hydraulic liquid for driving one or the other of the dual motors 37 & 44 responsive to opposite liquid circulation, there are important differences. For example, the adjustable pressure relief valve 56 establishes the high pressure ($P_{max..}$) in I/O separate ports 29/31 while flow restrictors 59 establishes the low pressure ($P_{min..}$) in the remaining I/O ports 29/31 establishing a pressure difference ($\Delta P$) between the respective I/O chambers 14/16. Differential in the exhaust rate of hydraulic liquid from the driving motor 37/44 and the demand rate for that liquid of the pumping motor 37/44 determines pressure ($P_a$) in the common bypass line 26. [In winding systems, $P_a$ is a function of position of the mechanical elements 52 coupling the drives of the motors 37 & 44.] Because one of the motors 37/44 is always pumping from bypass line 26 into the low pressure I/O chamber 14/16, pressure in the bypass line 26 is less than or equal to that in the low pressure I/O chamber 14/16, i.e., $P_a \leq P_{min}$. driving motor is rotating faster than the pumping motor, hydraulic exhaust rate into the bypass line 26 exceeds the hydraulic demand rate, and $P_a \approx P_{min.}$, i.e. determined by the flow restrictor 59.

Because $P_a \leq P_{min..}$, absent the shuttle rod 19, it is possible that ball 21 in the low pressure I/O chamber 14/16 could seat and seal as liquid is circulated through the manifold 11 by pump 47, halting liquid circulation through the manifold 11 and the desired anti-cavitation feature of the manifold is lost, i.e. the demand of the pumping motor in excess of the exhaust of the driving motor could not be made up from its output. Also upon stopping liquid circulation through the manifold 11, absent the shuttle rod 19, pumping motor 37/44 would hydraulically lock preventing its shaft from rotating in the pumping direction since the separate I/O line 21/39 coupled to the I/O port 39 of motor 37/44 would be liquid full.

In contrast, with the shuttle rod 19, shuttle ball 21 in low pressure I/O chamber 14/16 does and can not seat, unless circulation of liquid through manifold 11 is reversed (using pump 47 or solenoid valve 62). Accordingly, drive shaft of pumping motor 37/44 is always free to be rotated in the pumping direction, and upon halting liquid circulation through the manifold 11, can be rotated in the driving direction, i.e., the respective I/O ports 39 of the motor are hydraulically coupled. And, because the hydraulically derived force acting upon the shuttle balls 21 and shuttle rod do not promptly equalize, when hydraulic circulation through the invented manifold 11 is stopped, the pumping motor 37/44 will retain that status even with a biasing force g or spring 54.

In particular, looking at FIG. 1, for counter-clockwise circulation, the $\Delta P$ between I/O chambers 14 & 16 must be of sufficient magnitude that consequent hydraulic forces acting on and via the shuttle balls 21 and rod 19 are greater than the biasing force tending to force shuttle ball toward valve seat 18. Upon halting counter-clockwise circulation, until the hydraulic pressures bleed off, motor 44 will retain pumping motor status allowing its drive shaft to be rotated in either direction. To explain, rotating drive shaft of motor 44 in the pumping direction pumps liquid from bypass line 26 into I/O chamber 14 further downstream from the high pressure I/O chamber 16 which then recirculates via passage 17 back to the bypass line 26. Continued circulation of liquid in the describe loop will tend to maintain its pressure low relative to the static liquid pressure in I/O chamber 16. In this case the liquid circulates in a direction creating frictional forces tending to seat ball 21 in chamber 14 and dislodge ball in chamber 16. Accordingly, the skilled hydraulic designer should adjust the pressure relief valve 56 establishing $P_{max.}$ in I/O line 31 with reference to the biasing force of g or spring 54. Oppositely rotating drive shaft of motor 44 in the driving direction pumps liquid from I/O chamber 14 into bypass line 26 which then recirculates via passage 17 back to I/O chamber 14. In this case liquid circulation is in an unchecked direction opposing the biasing force and seating of ball 21 on seal 18 will not prevent circulation. In any case, should the biasing force overcome the differential pressures maintaining pumping motor status of motor 44, pump 47 or solenoid valve 62 can momentarily be switched on for counter-clockwise circulation re-establishing open or pumping motor status to motor 44 (dislodging ball 21 from valve seat 18 in I/O chamber 14 and seating ball 21 on valve seat 18 in I/O chamber 16).

Figure 6:
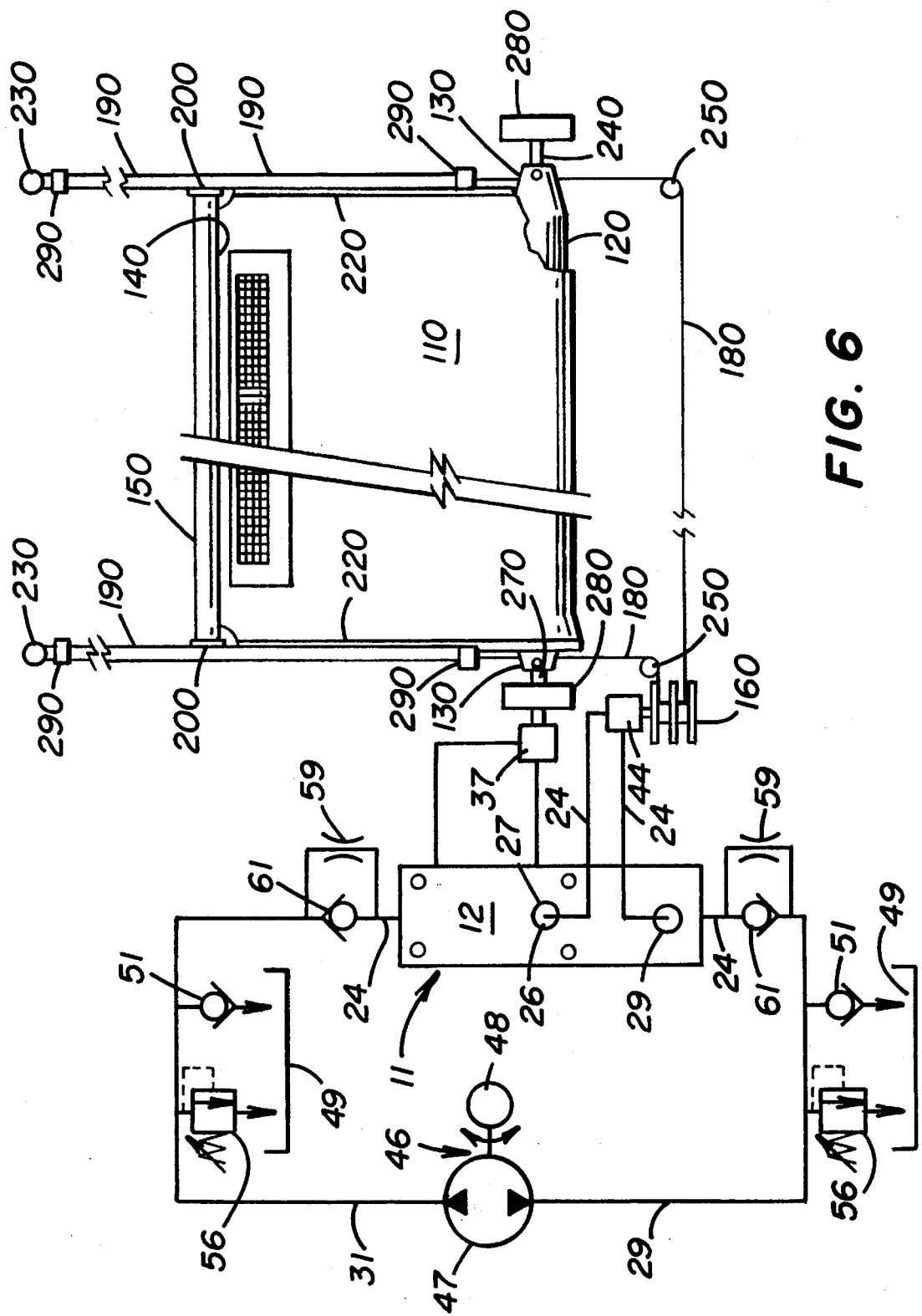
FIG. 6 is a top plan view showing the essential components of an automatic pool cover system powered by a drive coupled, dual motor, reversible hydraulic drive system with the invented anti-cavitation manifold.

FIG. 6 shows a top plan view of an automatic pool cover system which includes a leading edge and slider system of the type described in Applicant's U.S. Pat. No. 4,939,798, entitled "LEADING EDGE AND TRACK SLIDER SYSTEM FOR AN AUTOMATIC SWIMMING POOL COVER" and with conically tapered hubs at either end of the cover drum as described Applicant's U.S. Pat. No. 5,067,184 entitled, "A COVER DRUM HAVING TAPERED ENDS FOR AN AUTOMATIC SWIMMING POOL COVER.". In particular, a flexible vinyl fabric pool cover 110, is attached for winding around a cylindrical cover drum 120 with conically tapering end sections or hubs 130 supported for rotation at the end of a swimming pool (not shown). The front edge 140 of the cover 110 is supported by a rigid leading edge 150 spanning the width of the pool above the water between conventional parallel "C" channel swimming pool tracks 190 secured along the sides of the swimming pool. Sliders 200 coupled at each end of the rigid leading edge 150 are fastened to small diameter cables 180. The sliders 200 are captured and slide within the "C" channels of the respective tracks 190. The cables are incorporated into and form a beaded tape 220 sewn to the side edges of the cover 110. Each cable 180 extends from the slider 200, is trained around a pulley 230 at the distal ends of the tracks 190, and return via return internal "C" channels within the respective tracks 190 to ultimately connect with and wind onto a pair of cable take-up reels 160. Return pulleys 250 provide the necessary changes of direction between the return channels of the tracks 190 and the cable reels 160. The beaded tapes 220 sewn to the side edges of the cover 11 are also captured by and slide within the conventional "C" channels of the respective tracks 190. Stops 290 are located at the distal ends of the tracks 190 to stop extension and retraction of the cover 110. (See Applicant's U.S. Pat. No. 5,349,707).

The cover drum 120 is supported for rotation between the respective tracks 190, within a trench located at one end of the pool (See U.S. Pat. Nos. 5,184,357 & 5,327,590) by a bearing blocks 280 supporting axles 240 and 270 coaxially extending from the conical hubs 130 at either end of the cover drum 120. Additional bearing blocks can be journaled around to the respective supporting axles 240 & 270 to provide additional capacity (and/or rigidity) for mechanical supporting the cover drum 120. However, care should be exercised in locating such additional bearing blocks to insure a desired range of axial translation of the cover drum drive train. (See U.S. Pat. No. 5,067,184). A reversible hydraulic motor 44 is coupled for rotating the cable reels 160, while second reversible hydraulic motor 37 is coupled to the cover drum axle 270 for rotating the cover drum 120. The cable reels 160, cables 180, cover 110 and cover drum 120 comprise the mechanical components 52 (FIGS. 1 & 3) of the system which couple the respective drives of reversible motors 37 & 44. FIG. 6 also diagrams the respective hydraulic elements of circulation loops coupling a reversible source of hydraulic power 46 via the invented manifold 11 to the respective reversible hydraulic motors 37/44.

The invented anti-cavitation hydraulic manifold coupling two, drive coupled, reversible hydraulic motors to a reversible source of hydraulic power has been described in context of both representative and preferred embodiments which have reference to automatic swimming pool cover systems invented and developed by the Applicant. It should be recognized that the hydraulic parameters of the invented anti-cavitation manifold can be modified by skilled hydraulic engineers and designers to obtain desired or modify existing hydrostatic and hydrokinetic performance characteristics of such drive couple, dual motor, reversible hydraulic drives systems. Such hydraulic parameters include but are not limited the relative lengths and diameters of the translation passage and shuttle rod, the relative diameters and volumes of the I/O chambers, the relative lengths and hydraulic resistance presented by the respective circulation loops through the manifold, the volume of the bypass line, and the diameters of the respective I/O ports communicating to each I/O chambers and to the bypass line. For example, the length and hydraulic diameter of the shuttle rod may be varied for adjusting time constants for optimizing serve positioning actuated by a reversible hydraulic drive system.

In addition, the functional elements of the anti-cavitation hydraulic manifold coupling two, drive coupled, reversible hydraulic motors to a reversible source of hydraulic power have hydraulic equivalents. For example, the functional tasks performed by shuttle balls and the translating shuttle rod preventing the respective I/O chambers from being simultaneously isolated from the bypass line could be hydraulically performed by a double ended piston/rod translating responsive to liquid pressure for establishing liquid communication between the bypass line and the particular I/O chamber not receiving liquid input from the reversible source of hydraulic power. Accordingly, while such variations of and to the hydraulic parameters of the invented anti-cavitation manifold are not exactly described herein, they will fall within the spirit and the scope of invention as described and set forth in the appended claims.

I claim:

1. A manifold for hydraulically coupling a reversibly source of hydraulic power for reversibly circulating hydraulic liquid to a drive coupled, dual motor, reversible hydraulic drive system, comprising, in combination:

(i) two hydraulic input/output (I/O) chambers each hydraulically coupled to receive input liquid from the reversibly source of hydraulic power, and each hydraulically coupled for providing liquid input to and receiving liquid output from one reversible hydraulic motor;

(ii) a tubular bypass cavity hydraulically coupled to receive liquid from and provide liquid to both reversible hydraulic motors;

(iii) a translation passageway having an opening into each input/output (I/O) chamber hydraulically establishing communication between each chamber and the tubular bypass cavity;

(iv) a ball within each input/output (I/O) chamber seatable upon a valve seat annularly surrounding the opening of the translation passageway for isolating the tubular bypass cavity from hydraulic liquid input from the reversibly source of hydraulic power and for directing that liquid to the particular reversible hydraulic motor coupled to that chamber to rotate its actuator; and (iv) a shuttle rod translating in the translation passageway having a cross section for permitting liquid to flow though the translation passageway and having a length longer than the translation passage for preventing the respective balls in the input/output (I/O) chambers from simultaneously seating upon the valve seats in the respective input/output (I/O) chambers; whereby, the hydraulic output of the remaining reversible hydraulic motor is hydraulically coupled to its input via the tubular bypass cavity and translation passageway enabling it to function as a pump without cavitating.

2. In a reversible hydraulic drive system including a reversible source of hydraulic power for reversibly circulating a hydraulic liquid, and two reversible hydraulic motors each having an actuator mechanically linked to that of the other, an anti-cavitation manifold, comprising in combination:

(i) a single block of material having a central tubular passageway with an enlarged cylindrical input/output (I/O) chamber at each end hydraulically coupled for receiving hydraulic liquid input from the reversible source of hydraulic power, and having an annular valve seat around an opening of the central tubular passageway into each of the enlarged cylindrical input/output (I/O) chambers;

(ii) a ball larger than the central tubular passageway located in each enlarged input/output chamber for seating upon the annular valve seat and isolating the central tubular passageway from liquid input flowing from the reversible source of hydraulic power;

(iii) a shuttle rod located in the central tubular passageway between the input/output (I/O) chambers, the rod having a cross-section for allowing liquid to flow through the central tubular passageway and having a length longer than the central tubular passageway for preventing the balls in the respective chambers from simultaneously seating upon the valve seats in the respective chambers;

(iv) a tubular bypass cavity penetrating through the block of material intercepting the tubular passageway between the input/output (I/O) chambers for hydraulically receiving liquid exhausting from and providing liquid input to one of the reversible hydraulic motors at each of its ends; and (v) two separate ports each penetrating into the block of material to one of the enlarged input/output (I/O) chambers for hydraulically providing liquid to and receiving liquid exhausting from one of the reversible hydraulic motors, whereby, liquid from the reversible source of hydraulic power circulating in either direction seats the ball in one of the input/output (I/O) chambers drives, translates the shuttle rod with the central tubular passageway for preventing the ball in the other input/output (I/O) chamber from seating upon the valve seat in that chamber and drives the actuator of one of the reversible motors which in turn moves the actuator of the other reversible motor causing it to pump liquid from the tubular tubular bypass cavity, and exhaust liquid into its particular input/output (I/O) chamber which is hydraulically coupled to the tubular tubular bypass cavity via the central tubular passageway for preventing cavitation.

3. In a reversible hydraulic drive system including a reversible source of hydraulic power for reversibly circulating a hydraulic liquid, and two reversible hydraulic motors having mechanically linked actuators wherein the actuator of one motor moves responsive movement of the actuator of the other motor causing that motor to functionally pump liquid, a means for preventing cavitation, comprising in combination:

(i) two hydraulic input/output means each for hydraulically receiving input from the reversible source of hydraulic power, and for providing liquid input to and receiving liquid output from one reversible hydraulic motor;

(ii) bypass means hydraulically communicating with each input/output (I/O) chamber of hydraulically receiving liquid from and providing liquid to bot reversible hydraulic motors;

(iii) isolating means within each input/output (I/O) chamber for hydraulically isolating the bypass means from, and directing hydraulic liquid input circulating from the source of hydraulic power to the particular reversible hydraulic motor for moving its actuator; and (iv) means for preventing the input/output (I/O) chambers from being simultaneously isolated from the bypass means, whereby, the hydraulic output of the hydraulic motor functionally pumping liquid is always hydraulically coupled to its input via the bypass means.

4. The anti-cavitation hydraulic mechanism described in claim 1 or 2 or 3 wherein hydraulic liquid circulated from the reversible source of hydraulic power has a pressure $P_{max.}$ and further including:

(a) a flow restrictor means hydraulically coupled between the reversible source of hydraulic power and each input/output (I/O) means for establishing a pressure $P_{min.}$ against which each reversible hydraulic motor must pump where $P_{max.} > P_{min.}$; and (b) a bypass check valve means hydraulically coupled in parallel with each flow restrictor for bypassing the flow restrictor when liquid circulates from the reversible source of hydraulic power to the particular input/output (I/O) means.

5. The hydraulic mechanism described in claim 4 wherein:

(c) each reversible hydraulic motor includes two input/output ports one of which is hydraulically coupled to one input/output (I/O) means, the other of which is hydraulically coupled to the bypass means of the manifold; and (d) circulation of liquid by the reversible source of hydraulic power in a first direction causes a first reversible motor to function as a motor receiving liquid input from its particular input/output chamber and exhausting liquid into the bypass for moving its actuator, and a second reversible hydraulic motor to function as a pump responsive to movement of its actuator pumping liquid from the bypass means and exhausting liquid into its particular input/output chamber; and (e) circulation of liquid by the reversible source of hydraulic power in a second direction causes the second reversible motor to function as a motor receiving liquid input from its particular input/output chamber and exhausting liquid the bypass for moving its actuator, and the first reversible hydraulic motor to function as a pump responsive to movement of its actuator pumping liquid from the bypass means and exhausting liquid into its particular input/output chamber; and (f) hydraulic pressure of the liquid in the bypass means ($p_a$) is at most equal to $P_{min}$, ($p_a \leq P_{min}$).

6. The anti-cavitation hydraulic mechanism described in claim 5 wherein maximum hydraulic pressure of the liquid in the bypass means for hydraulic liquid circulated in the first direction ($P_{min1}$) and maximum hydraulic pressure of the liquid in the bypass means for hydraulic liquid circulated in the second direction ($P_{min2}$) are different, ($P_{min1} \neq P_{min2}$).

7. The anti-cavitation hydraulic mechanism described in claim 6 and further including a pressure relief valve hydraulically coupled between the reversible source of hydraulic power and each input/output (I/O) means for adjusting pressure $P_{max}$ input from the reversible source of hydraulic power into each input/output (I/O) means.

8. The anti-cavitation hydraulic mechanism described in claim 7 wherein pressure of the hydraulic liquid from the hydraulic power source circulated in the first direction has a pressure $P_{max1}$, and pressure of the hydraulic liquid from the hydraulic power source circulated in the second direction has a pressure $P_{max2}$ are different, ($P_{max1} \neq P_{max2}$).

9. The anti-cavitation hydraulic mechanism described in claim 3 wherein the means preventing the input/output (I/O) chambers from being simultaneously isolated from the bypass means comprises in combination:

(v) a translation passageway;

(vi) shuttle rod translatable longitudinally in the passageway from a first position opening hydraulic communication between a first input/output (I/O) means and the bypass means and permitting hydraulic isolation of a second input/output (I/O) means from the bypass means, to a second position opening hydraulic communication between the second input/output (I/O) means and the bypass means allowing hydraulic isolation of the first input/output (I/O) means from the bypass means; and (vii) means for translating the shuttle rod back and forth between the first and second positions responsive to a difference in hydraulic liquid pressure ($\Delta P$) between the respective input/output (I/O) means.

10. The hydraulic mechanism described in claim 1 or 2 or 9 wherein the anti-cavitation mechanism is aligned with the shuttle rod parallel a force for biasing the shuttle rod in a first position for permitting hydraulic communication between the first input/output (I/O) means and the bypass means and hydraulically isolating the second input/output (I/O) means from the bypass means.

11. The anti-cavitation hydraulic mechanism described in claim 10 wherein the shuttle rod is oriented vertically and the force biasing the mechanism is gravity.

12. The anti-cavitation hydraulic mechanism described in claim 10 and further including a spring for functionally providing a force for biasing the shuttle rod.

13. The anti-cavitation hydraulic mechanism of claim 9 wherein:

(viii) the hydraulic input/output (I/O) means each comprise a larger diameter I/O chamber located at one end of a smaller diameter translation passageway each having an annular valve seat around an opening of the translation passageway into the chamber, (ix) the isolating means comprises a ball located in each I/O chamber adapted to seat upon the annular valve seat around the opening of the translation passageway into the I/O chamber responsive to hydraulic liquid input circulating from the source of hydraulic power and hydraulically isolating the particular I/O chamber from the bypass means; and (x) the shuttle rod has a cross section adapted to allow hydraulic liquid to flow through the translation passageway.

14. The anti-cavitation hydraulic mechanism of claim 13 wherein the shuttle rod is longer than the translation passageway, and wherein a difference in hydraulic liquid pressure ($\Delta P$) between the respective (I/O) chambers forces the ball in the chamber having a higher liquid pressure to seat upon the annular valve seat in that chamber and translates the shuttle rod toward the I/O chamber having a lower liquid pressure preventing the ball in such lower pressure I/O chamber from seating upon the valve seat in that I/O chamber responsive to liquid exhausting from the reversible motor functionally pumping liquid from the bypass means, whereby, liquid can circulate from the lower pressure I/O chamber to the bypass means via the translation passageway.

15. The anti-cavitation hydraulic mechanism of claim 14 wherein the shuttle rod is aligned parallel a force for biasing the mechanism for permitting hydraulic communication between a first I/O chamber and the bypass means and hydraulically isolating the second I/O chamber from the bypass means.

16. The anti-cavitation hydraulic mechanism of claim 15 wherein the bypass means comprises a tubular cavity intersecting the translation passageway and provides liquid input to and receives liquid exhaust from one reversible hydraulic motor at each of its ends.

17. The anti-cavitation hydraulic mechanism of claim 1 or 2 or 14 and further including means for retaining the ball within each input/output (I/O) chamber.

18. The anti-cavitation hydraulic mechanism of claim 17 wherein the means for retaining the ball within each input/output (I/O) chamber comprises a hydraulic coupling mechanism for coupling each input/output (I/O) chamber to a hydraulic line connected to the reversible source of hydraulic power, the coupler having an interior, flow restricting annular seating surface receiving the ball upon circulation of liquid from the input/output (I/O) chamber to the source of reversible hydraulic power for establishing a pressure $P_{min}$ against which the reversible hydraulic motor functionally pumping pumps.

19. The anti-cavitation hydraulic mechanism of claim 17 wherein the means for retaining the ball within each input/output (I/O) chamber comprises a pin penetrating into the each input/output (I/O) chambers confining the ball proximate the annular valve seat.

20. The anti-cavitation hydraulic mechanism of claims 1 or 2 or 3 and further including an extendible and retractable swimming pool cover wherein:

A) a first reversible hydraulic motor is mechanically coupled for rotating at least one cable reel around which a pair of cables, each coupled to a front side edge of a pool cover, wind and unwind, B) a second reversible hydraulic motor is mechanically coupled for rotating a cover drum around which the pool cover winds and unwinds;

C) the reversible source of hydraulic power circulating hydraulic liquid in a first direction provides a driving torque via the first motor for rotating the cable reel to wind the cables around the reel while the second motor simultaneously provides a resistive torque for resisting unwinding rotation of the cover drum as the cover unwinds and is drawn across covering the pool; and D) the reversible source of hydraulic power circulating hydraulic liquid in a second direction provides a driving torque via the second motor for rotating the cover drum to wind the cover around the cover drum, while the first motor simultaneously provides a resistive torque for resisting unwinding rotation of the cable reels to tension the cables and cover as the cover retracts uncovering the pool.

21. The anti-cavitation hydraulic mechanism described in claim 3 wherein the reversible source of hydraulic power circulates hydraulic liquid into the particular input/output means at an input pressure $P_i$, and wherein the reversible hydraulic motor functioning as a pump circulates hydraulic liquid into the particular input/output means at at an output pressure $P_o$, and wherein the means for preventing the input/output (I/O) chambers from being simultaneously isolated from the bypass means comprises means hydraulically coupling between the reversible source of hydraulic power and the bypass means for establishing and maintaining a bypass pressure $P_a$ where $P_a$ is always less than $P_i$ in the input/output (I/O) chamber receiving liquid from the reversible source of hydraulic power and always greater than $P_o$ in the input/output (I/O) chamber receiving liquid from the particular reversible hydraulic motor functioning as a pump.

* * * * *